United States Patent [19]

Karlsson

[11] 4,444,660

[45] Apr. 24, 1984

[54] DEVICE AT PRESSES FOR DEWATERING MATERIALS

[76] Inventor: Einar L. Karlsson, Åbyn 1203, Burträsk, Sweden, S-937 00

[21] Appl. No.: 254,747

[22] Filed: Apr. 16, 1981

[30] Foreign Application Priority Data

Apr. 18, 1980 [SE] Sweden ................................ 8002927

[51] Int. Cl.³ ................................................ B01D 33/14

[52] U.S. Cl. .................................... 210/386; 100/118; 100/153; 162/DIG. 1; 210/400; 210/401

[58] Field of Search ................................ 100/118–120, 100/128, 151–153; 162/348, 358, DIG. 1; 210/297, 359, 400, 401, 386

[56] References Cited

U.S. PATENT DOCUMENTS

| | | | |
|---|---|---|---|
| 2,094,350 | 9/1937 | Cartigny | 210/401 |
| 2,554,988 | 5/1951 | Hollis | 100/151 |
| 3,849,313 | 11/1974 | Lopker | 210/400 |
| 3,998,149 | 12/1976 | Malarkey | 210/400 |
| 4,053,419 | 10/1977 | Pav | 210/401 |
| 4,100,248 | 7/1978 | Adams | 162/DIG. 1 |
| 4,172,416 | 10/1979 | Hakansson | 100/118 |
| 4,178,251 | 12/1979 | Iwatani | 100/118 |
| 4,260,492 | 4/1981 | Ito et al. | 210/401 |

FOREIGN PATENT DOCUMENTS

| | | | |
|---|---|---|---|
| 2111526 | 9/1971 | Fed. Rep. of Germany . | |
| 2306827 | 5/1976 | France . | |
| 2021433 | 12/1979 | United Kingdom | 210/400 |

*Primary Examiner*—Peter A. Hruskoci

[57] ABSTRACT

This invention relates to a device at presses for dewatering materials such as peat, digested sludge and other fiber material, which device comprises a belt, which in cooperation with at least one press roll is arranged to apply a press pressure to a material introduced between belt an roll. Certain problems exist here in achieving a high and evenly distributed press pressure over the whole belt width, but this and other problems are solved according to the invention in such a way that the belt consists of a number of separate belt elements (19) located beside each other, each with a cross sectional form decreasing from the side (20) facing the material and with edge portions (23) being in contact with each other, which portions are so elastic that they are opened by the material exposed to the press pressure for discharge of water pressed out of the material.

7 Claims, 7 Drawing Figures

DEVICE AT PRESSES FOR DEWATERING MATERIALS

This invention relates to a device at presses for dewatering materials such as peat, digested sludge, cellulosic pulp or other fiber material, which device comprises at least one endless belt which in cooperation with at least one press roll, part of whose circumference is arranged to be enclosed by the belt, exposes material introduced between belt and roller to a press pressure.

For dewatering fiber pulps it is previously known to use two endless belts arranged to run with their broadsides against each other and to carry the fiber pulp to be dewatered between themselves and to have these belts thus extended run about one or more rolls adapted consecutively along a feeding path, the material between the belts being exposed to a press pressure at the passage of each such roll. For separation of the liquid which is then pressed out of the material at least one belt must be permeable to liquid, and such belts are also known and consist of liquid permeable material, such as close-meshed nets, felt and the like. However, this known type of belts has not turned out to be especially useful at dewatering of peat and similar materials because they are clogged relatively quickly and lose in this way their water permeable ability, and they are not capable of exposing the peat to a similar pressure over the whole of their width, with the consequence that certain portions of the peat are not dewatered at all or in a slight degree. In order to overcome these problems and disadvantages belts of rubber cloth made water permeable by the aid of slots have been tested. By such belts the problem with clogging has been solved, but not the problem with achieving a high press pressure evenly distributed over the whole width of the belt, which press pressure is required for achieving a satisfactory dewatering of peat and similar materials.

It is therefore the object of this invention to make a more effective dewatering of peat and other materials possible than has so far been feasible in a dewatering press, and this object of the invention is also achieved by means of the characterizing features defined in the claims.

Figure 1:
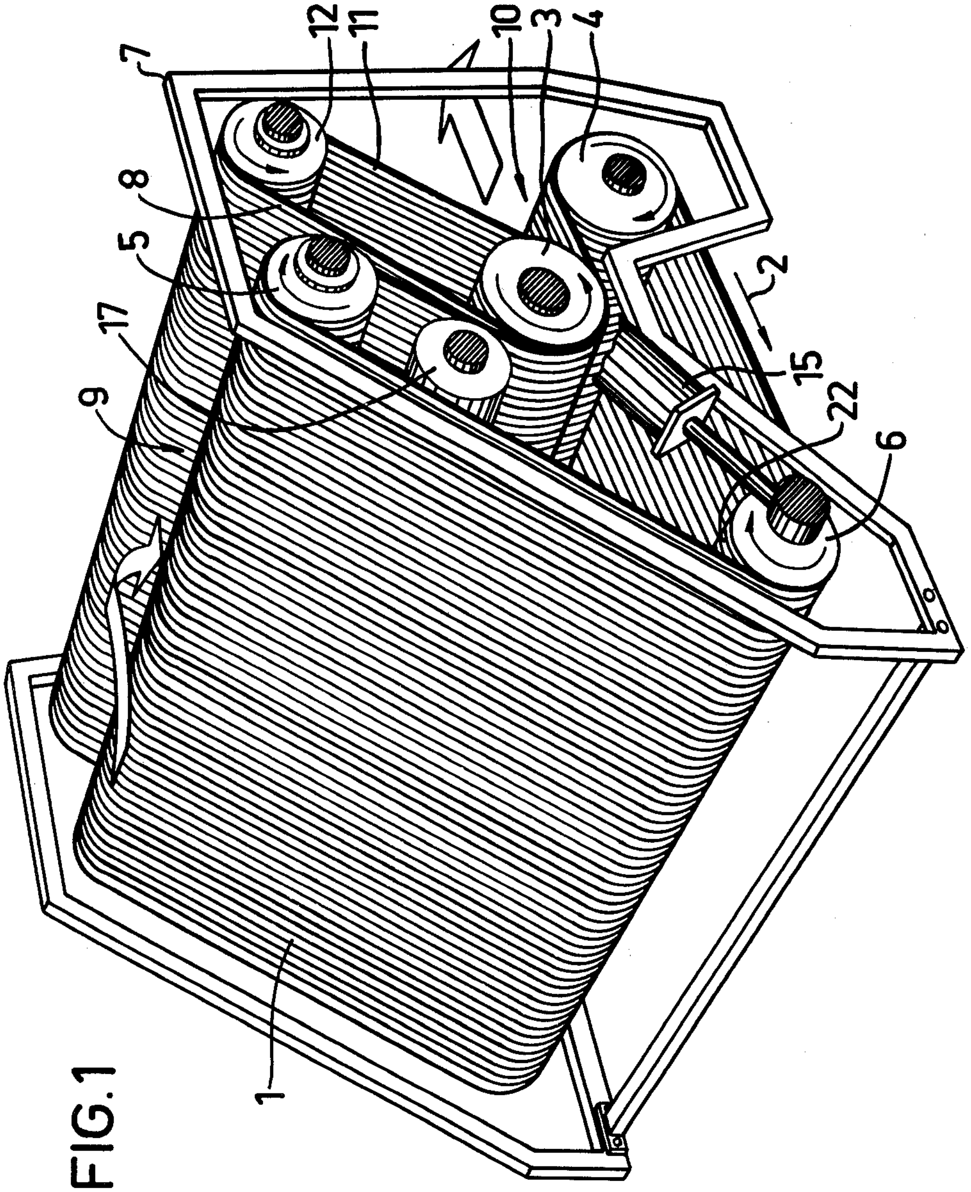
Figure 2:
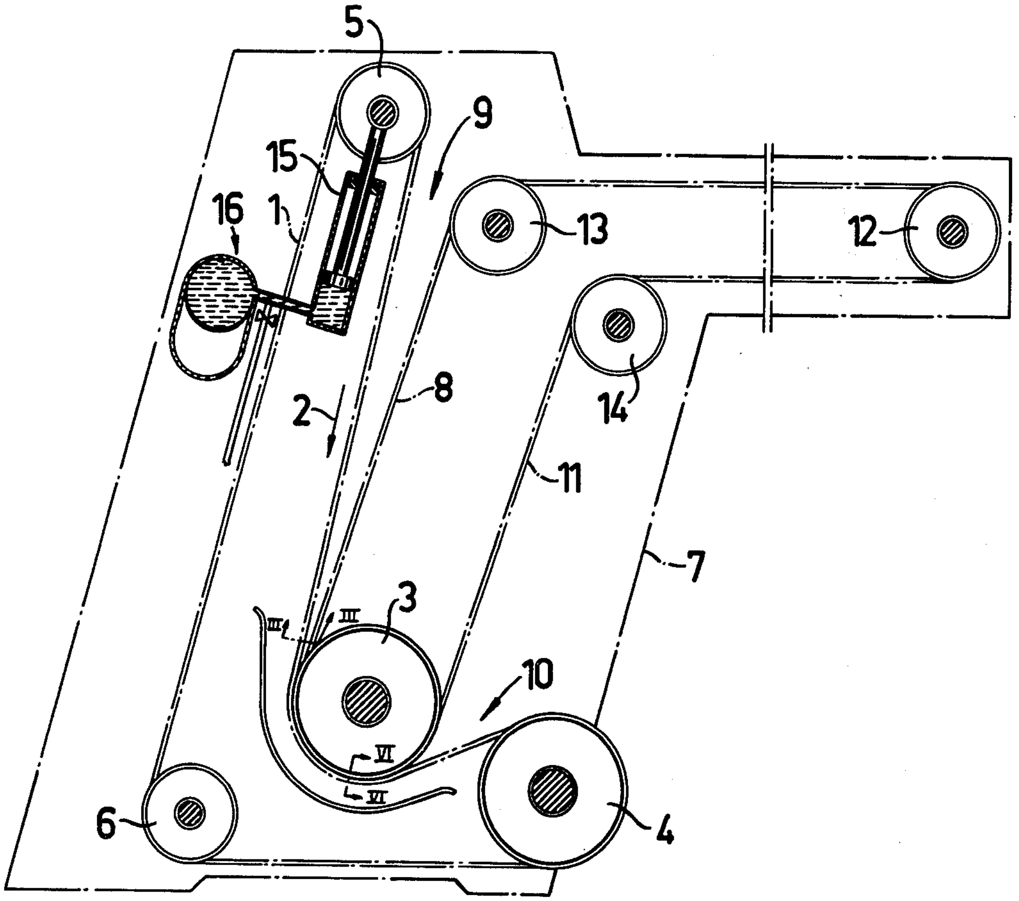
Figure 3:
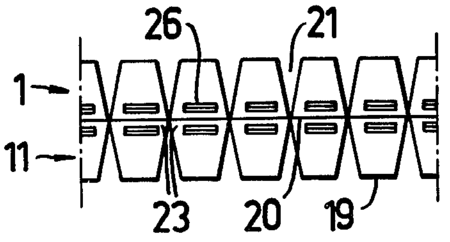
Figure 4:
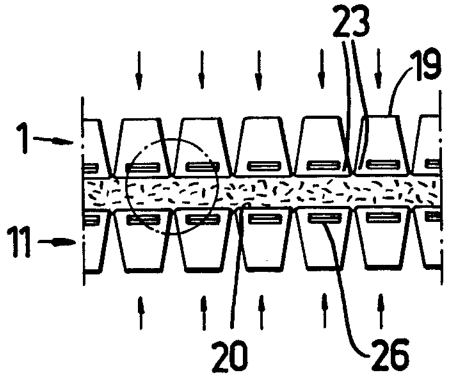
Figure 5:
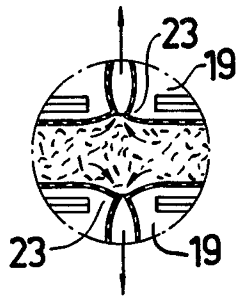
Figure 6:
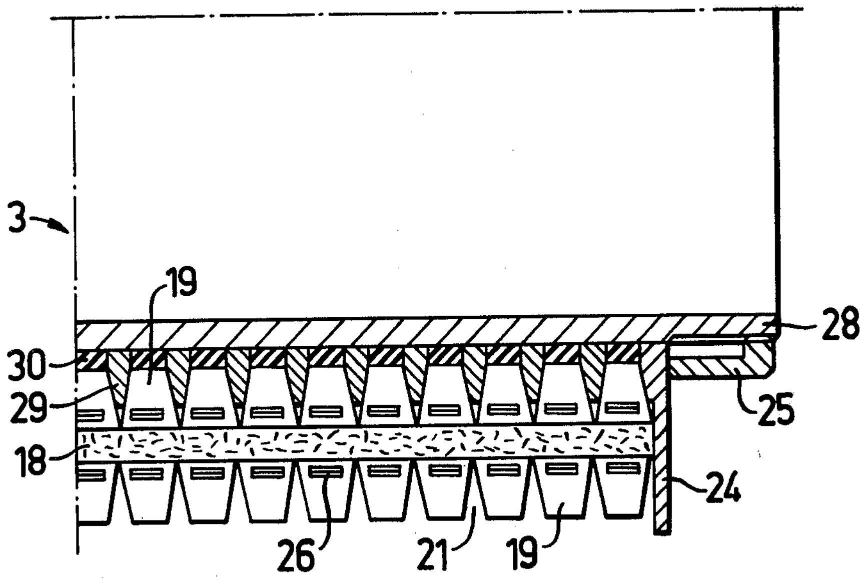

The invention will be defined more in detail in the following with reference to the enclosed drawings, in which FIGS. 1 and 2 show in perspective and section, respectively, two different embodiments of dewatering presses, at which the present invention can be utilized. FIGS. 3 and 4 show a section along the line III—III in FIG. 2 without and with peat between the belts, FIG. 5 shows on a larger scale a detail from FIG. 4 to illustrate how the belt opens for discharge of water, FIG. 6 shows a section along the line VI—VI in FIG. 2 and FIG. 7 shows a similar section through a modified design.

The dewatering presses shown in the drawings comprise at least one endless liquid permeable belt 1, which runs about a press roll 3 in the direction marked by the arrow 2 and over two end rolls 4 and 5 and a breaking roller 6, which rolls are mounted in a stand 7. In the moving direction of the belt before the press roll 3 the press belt forms together with another means 8 a feed opening 9, which narrows off towards the press roll, for the material to be dewatered by being exposed to pressure between the press belt 1 and the press roll 3. After the press roll 3 the band 1 forms in the embodiments shown in the drawings a discharge plane 10 for the material dewatered in the press. For scraping off material possibly adhering at the press roll 3 scrapers acting against the press roll can be arranged even if this is not shown in the drawings.

Figure 7:
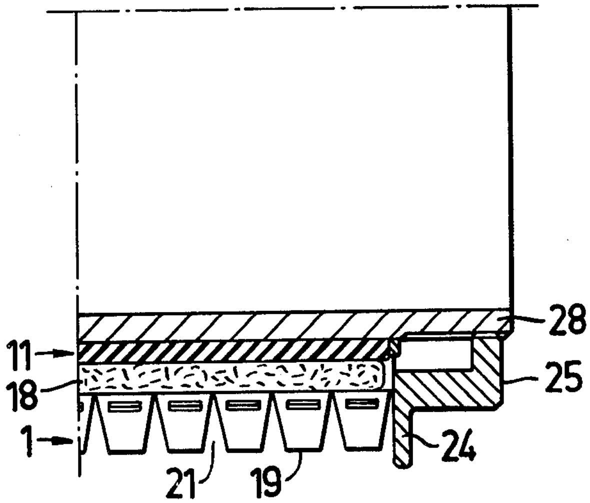

Said means 8 which forms together with the press belt 1 the feed opening 9, consists of an endless belt 11 of the same type as the press belt 7 in the embodiments shown in the drawings as examples, but can also be a liquid permeable belt of rubber, steel or a similar material as shown in FIG. 7. The belt 11 runs about the press roll 3 between the latter and the press belt 1 and about another end roll 12, which in the embodiment according to FIG. 2 is placed so that the belt 11 betwen the roll 12 and an upper breaking roll 13 forms a feed plane for the material to be introduced into the press. In the embodiment according to FIG. 2 there is also a lower breaking roll 14 arranged for the belt 11.

Instead of a belt said means 8 can consist of a wall of plate or another suitable material with a low surface friction, which wall in such a case extends from the press roll 3 and approx. up to the upper breaking roll 13 which in this case can be an end roll of a feed conveyor.

Thus, if the means 8 is a wall the material to be dewatered will be pressed directly against the press roll 3 by the press belt 1.

One or more of the rolls supporting the press belt 1 and possibly the belt 11 can be driven, preferably the end roll 4 and the press roll 3, and the operation of these rolls should be such that no relative motion between the press belt 1 and the belt 11 and the press roll 3, respectively arises due to which material is exposed to shearing forces except for the intended press pressure during the passage of the press roll. The press pressure is produced by the press belt 1 and is adjustable by a change of the belt tension of the press belt. For adjustment of the belt tension one or more of the rolls supporting the press belt can be displaceably arranged in the press. In the examples according to FIG. 1 the breaking roll 6 is rotatably supported between two hydraulic cylinders 16, by means of which the breaking roll 6 can be displaced for stretching the press belt. In the example according to FIG. 2 the end roll 5 is displaceably supported between two hydraulic cylinders 15 which make a change of belt tension possible and are shown as coupled to a pressure accumulator 16, which maintains the press pressure at a constant even if the thickness of the material 18 fed between the press belt and the press roll is changed.

In FIG. 1 a pressure roll 17 placed at the feed opening 9 close to the press roll 3 is shown, which is movable perpendicularly to the press roll 3 and adapted to press the press belt 1 towards the press roll 3 for increasing the winding angle between press belt and press roll, which angle should be as great as possible, i.e. approach 180° and preferably more.

The liquid permeable press belt 1 consists according to the present invention of a number of separate belt elements 19 arranged beside each other, which each can have in cross section a triangular or truncated wedge shape similar to a V-belt and which are kept edge to edge at least between the end rolls 5 and 4 to form with their wider surface 20 a substantially plane belt side facing the press roll 3. Due to their cross sectional form the belt elements 19 form on the other side V-shaped grooves 21, which extend along the whole length of the belt and function as water diverting means.

The belt elements are kept together by guide grooves 22 formed in the end rolls 4 and 5 and also in the breaking roll 6 and having a form corresponding to the cross sectional form of the belt elements and a depth less than the height of the elements. The number of guide grooves 22 correspond to the number of belt elements 19 included in the belt, and by the engagement of the belt elements in these guide grooves a very safe and reliable driving force transfer from drive roll to belt is obtained.

At least during the passage of the press roll 3 the belt elements of the press belt should be kept together by such a force that the edge portions 23 of the belt elements lie close to each other, and to achieve this at least the press roll 3 is provided with radial flanges 24, between which the belt 3 is running and of which at least one and preferably both are adjustable in the axial direction of the roll e.g. by means of adjusting nuts 25 arranged at the end of the rolls. Thus, the distance between the flanges 24 can be changed by means of these nuts and consequently the force by which the belt elements 19 are maintained as pressed against each other.

Inside its wider surface 20 each belt element 19 is provided with a longitudinal traction absorbing reinforcement 26, and its edge portions 23 on both sides of the reinforcement are made non-rigid and elastic. Due to this and thanks to the fact that these portions are not supported in the same strong or compact way as between the portions of the belt elements 19 between these portions they stand a lower pressure than the other portions of the belt elements and will due to this be pressed out and opened in a way as illustrated in FIG. 5 of the material when this is compressed by the belt 1 against the press roll 3 or against the belt 11 supported by this for discharge of the liquid which is then pressed out of the material. When there is no material between the belts 1 and 11 or the belt 1 and the press roll 3 the edge portions 23 will lie close to each other, as shown in FIG. 3.

When using a holding-up belt 11 of the same type as the press belt 1 the rolls 3 and 13 supporting the holding-up belt are in the embodiments according to FIGS. 1 and 3, 14, 12 and 13 in the embodiment according to FIG. 2 of course provided with guide grooves 22 and the belt elements 19 of the holding-up belt lie opposite to each other as shown in FIG. 3.

In order to be able to compensate a possible wear of the belt elements of the holding-up belt vertically the guide grooves of the press roll, as shown in FIG. 6, are formed by rings 29 arranged on a roll fram 28 which rings are laterally displaceable, i.e. in the axial direction of the press roll, and kept apart by elastic, annular distance means 30. These distance means are compressible and permit consequently a change of the groove width, and in this way it will be possible to compensate by means of the nuts 25 for a possible wear of the belt elements 19 in a simple way.

By designing the press belt in the form of separate traction reinforced belt elements in accordance with the principles on which the present invention is based not only a higher press pressure is obtained than what is possible to achieve by means of known belts but also that the material is exposed to an evenly distributed press pressure over the whole width of the belt, and consequently it is also uniformly dewatered over the whole width of the belt. As an example it can be mentioned that tests have shown that raw peat having an aqueous content of more than 90% can be dewatered by the present invention to an aqueous content of about 70%, which is to be compared with 75–76% of known dewatering presses. Another advantage achieved by this invention is that such materials as bark can be dewatered with the same good results as peat, which has not been possible in known presses.

This invention is not restricted to what is described above and shown in the drawings but can also be altered and modified in several different manners within the scope of the inventive thought set forth in the claims. Thus, it is possible to utilize the invention with other types of presses with at least one endless belt and at which the belt is supported on its side not facing the material and is stationarily pressed against a holder-on for dewatering material therebetween or presses with a number of belts cooperating in pairs and at which the belts in a pair of supported sides not facing each other and stationarily or in motion are pressed against each other for dewatering material between the belts. The belts can then be supported by plane plates or rolls pressed against each other.

What I claim is:

1. Apparatus for dewatering mixtures containing solid material and water comprising at least one endless belt trained over a plurality of end rolls and at least one press roll located between the end rolls, part of the circumference of the press roll being arranged to be enclosed by the belt so as to form a feed opening for said mixtures and so as to expose mixtures introduced into the feed opening and between belt and roll to press pressure, characterized in that said belt includes a plurality of separate belt elements lying beside each other, each with a cross sectional form decreasing from the side facing said press roll thereby forming a groove between each belt element and the adjacent belt element, each belt element having an internal longitudinal reinforcement between its edge portions close to its side facing said press roll, means for maintaining the edge portions at the greatest cross section of the belt elements in contact with each other, said edge portions being non-rigid and elastic, said edge portions contacting said press roll forming openings between said edge portions and through said grooves for discharge of water pressed out of said mixtures.

2. Apparatus as in claim 1 wherein said press roll is provided with a plurality of guide grooves for guiding the belt elements of the belt and for supporting the belt in an endless path.

3. Apparatus as in claim 1 wherein said means for maintaining said edge portions in contact includes radial flanges on said press roll adapted to keep the belt elements pressed against each other with a force determined in advance.

4. Apparatus as in claim 3 wherein said flanges are adjustable in the axial direction of the press roll.

5. Apparatus as in claim 1 including a second endless belt which is the same as the first-mentioned belt, said second belt being arranged between said press roll and said first-mentioned belt so as to support the material between the two belts.

6. Apparatus as in claim 5 wherein the belt elements of said second belt are arranged in guide grooves in the press roll which are formed by loose rings with elastic distance means between themselves.

7. Apparatus for dewatering mixtures containing solid material and water comprising at least one endless belt trained over a plurality of end rolls and arranged to cooperate with at least one pressing means located between the end rolls so as to form a feed opening for said mixtures and to expose mixtures introduced into the feed opening between said belt and said pressing means to a press pressure, characterized in that said belt includes a plurality of separate belt elements lying beside each other, each with a cross sectional form decreasing from the side facing said pressing means thereby forming a groove between each belt element and the adjacent belt element, each belt element having an internal reinforcement between its edge portions close to its side facing said pressing means, means for holding said edge portions in contact with each other, said edge portions being non-rigid and elastic, said edge portions contacting said pressing means forming openings between said edge portions and through said grooves for discharge of water pressed out of the mixtures.

* * * * *